(12) United States Patent
Liu

(10) Patent No.: US 10,281,899 B2
(45) Date of Patent: May 7, 2019

(54) MECHANICAL BAR CONVEYING DEVICE

(71) Applicant: CITIC Dicastal CO., LTD, Qinhuangdao (CN)

(72) Inventor: Taotao Liu, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 294 days.

(21) Appl. No.: 15/336,477

(22) Filed: Oct. 27, 2016

(65) Prior Publication Data

US 2017/0123405 A1 May 4, 2017

(30) Foreign Application Priority Data

Oct. 30, 2015 (CN) .......................... 2015 1 0732546

(51) Int. Cl.
| | |
|---|---|
| *G05B 19/402* | (2006.01) |
| *B66C 1/42* | (2006.01) |
| *B66C 5/02* | (2006.01) |
| *B66C 19/00* | (2006.01) |
| *B66C 17/04* | (2006.01) |
| *B62D 65/00* | (2006.01) |

(52) U.S. Cl.
CPC .............. *G05B 19/402* (2013.01); *B66C 1/42* (2013.01); *B66C 1/425* (2013.01); *B66C 5/02* (2013.01); *B66C 17/04* (2013.01); *B66C 19/00* (2013.01); *B62D 65/00* (2013.01); *G05B 2219/2637* (2013.01); *G05B 2219/35581* (2013.01)

(58) Field of Classification Search
None
See application file for complete search history.

(56) References Cited

U.S. PATENT DOCUMENTS

| | | | |
|---|---|---|---|
| 3,880,301 A * | 4/1975 | Reilly | .................... B65G 47/38 198/418.6 |
| 2017/0246763 A1* | 8/2017 | Weick | ....................... B28B 5/04 |

* cited by examiner

*Primary Examiner* — Cuong B Nguyen
(74) *Attorney, Agent, or Firm* — Howard IP Law, PLLC; Jeremy Howard

(57) ABSTRACT

The invention provides a mechanical bar conveying device consisting of a horizontal travel limiting device (1), a vertical axis servo reducer (2), a vertical descent depth detector (3), a vertical axis travelling mechanism (4), a horizontal axis servo reducer (5), a horizontal drive gear (6), a horizontal tow chain (7), a horizontal moving mechanism (8), a manipulator torque detector (9), a safety detection mechanism (10), a main frame (11), a horizontal frame (12), a vertical movement mechanism (16), a tow chain bracket (17), a tow chain (18), a vertical rack-and-pinion mechanism (19), a horizontal linear guide track (20), a vertical beam (21), a claw clamping mechanism (22), a claw ball screw (23), a manipulator servo reducer (24), a manipulator depth detector (25), and a claw and travel limiting combined mechanism (26). The device realizes automatic conveying of bars, and avoids the problems of manual conveying process, such as high environmental temperature, large intensity, low work efficiency and high risk of industrial accidents.

4 Claims, 2 Drawing Sheets

MECHANICAL BAR CONVEYING DEVICE

This application claims priority from CN 201510732546.0, filed on Oct. 30, 2015, the entire content of which is incorporated herein by reference.

TECHNICAL FIELD

The invention relates to the vehicle parts manufacturing field, in particular to a mechanical bar conveying device.

BACKGROUND ART

In a wheel hub manufacturing plant, spin casting wheel hub bars are usually conveyed by men. For heavy weight of bars, bar conveying facilities are designed in the spin casting field. However, the existing conveying facilities often have the following problems: (1) complex design and relatively high maintenance cost; (2) poor adaptability of the mechanism for different diameters of bars, causing high risk of industrial accidents due to unstable clamping; (3) relatively low production efficiency of the existing facilities and failure to meet the production requirements.

The above problems cause

Thus, there is an urgent need for a bar conveying facility in production to overcome the above problems and improve the conveying efficiency.

SUMMARY OF THE INVENTION

Therefore, an object of the invention is to provide a bar conveying device.

In one aspect of the invention, a bar conveying device is provided, which consists of a horizontal travel limiting device (1), a vertical axis servo reducer (2), a vertical descent depth detector (3), a vertical axis travelling mechanism (4), a horizontal axis servo reducer (5), a horizontal drive gear (6), a horizontal tow chain (7), a horizontal moving mechanism (8), a manipulator torque detector (9), a safety detection mechanism (10), a main frame (11), a horizontal frame (12), a vertical movement mechanism (16), a tow chain bracket (17), a tow chain (18), a vertical rack-and-pinion mechanism (19), a horizontal linear guide track (20), a vertical beam (21), a claw clamping mechanism (22), a claw ball screw (23), a manipulator servo reducer (24), a manipulator depth detector (25), and a claw and travel limiting combined mechanism (26), and is characterized in that: the main frame (11) is fixed on the ground, the horizontal frame (12) is mounted on the main frame (11), which are assembled into a main frame assembly (15); the horizontal linear guide track (20) is mounted on the horizontal frame (12) with the guide track direction being horizontal; the horizontal travel limiting device (1) is mounted on the horizontal frame (12) and located at one end of the horizontal linear guide track (20); the horizontal moving mechanism (8) is mounted on the horizontal linear guide track (20), and the horizontal axis servo reducer (5) and the horizontal tow chain (7) are mounted to the horizontal moving mechanism (8) and arranged to allow the horizontal moving mechanism (8) to move on the horizontal linear guide track (20) by the horizontal drive gear (6), to achieve free movement in the horizontal direction; the vertical descent depth detector (3), the tow chain bracket (17), the tow chain (18) and the vertical rack-and-pinion mechanism (19) are mounted on the vertical beam (21); the vertical axis servo reducer (2) and the vertical axis travelling mechanism (4) are vertically mounted on the horizontal moving mechanism (8) and arranged to engage by the vertical rack-and-pinion mechanism (19), to achieve the fixation and support for the vertical beam (21); the manipulator torque detector (9), the safety detection mechanism (10), the manipulator depth detector (25) and the claw and travel limiting combined mechanism (26) form a claw portion of the mechanical bar conveying device, and the claw portion of the mechanical bar conveying device is connected onto the bottom end of the vertical beam (21); the vertical axis travelling mechanism (4) is vertically mounted on the crossbeam of the horizontal moving mechanism (8) and arranged to make free movement in the vertical direction by the vertical movement mechanism (16) and vertical rack-and-pinion mechanism (19); the claw clamping mechanism (22) is connected with the manipulator servo reducer (24) by the claw ball screw (23), and the claw clamping mechanism (22) is mounted at the bottom end of the vertical axis travelling mechanism (4) and connected with the claw portion combined mechanism (26); the claw clamping mechanism (22) and the claw ball screw (23) are arranged to control the fastening and unfastening of the claw portion combined mechanism (26); the vertical axis travelling mechanism (4), the horizontal moving mechanism (8) and the claw clamping mechanism (22) are driven by a servomotor; and the vertical descent depth detector (3), the manipulator torque detector (9) and the manipulator depth detector (25) are connected to the vertical axis travelling mechanism (4) and arranged to detect vertical descent depth, claw torque and claw depth, respectively.

In a preferred aspect of the invention, the mechanical bar conveying device is arranged to be controlled by a programmable logic controller, and the programmable logic controller is arranged to be a global positioning system for automatic addressing operation.

In another preferred aspect of the invention, the programmable logic controller is arranged to calculate a first bar position, relative positioning address of each layer of bars and absolute positioning address relative to the device zero point, based on input bar diameters, numbers of bar stacking layers and bar stacking positions, and is arranged to calculate the moving distance of the claw and travel limiting combined mechanism (26) under the control of the servomotor, based on the relative positioning address of the conveyed bar;

In yet another preferred aspect of the invention, the horizontal axis of the claw and travel limiting combined mechanism (26) takes, as the maximum value of horizontal movement at each time, the sum of or the difference between the product of the first bar positioning data as base number multiplied by the number of bars stacked in the horizontal direction and the difference in number between the odd and even layers of bars stacked, the vertical axis takes, as the maximum value of vertical movement at each time, the difference between the product of the first bar positioning data as base number multiplied by the number of bars stacked in the vertical direction and the corresponding ratio of bar diameter to arc length, and the triaxial servomotor (horizontal axis, claw axis and vertical axis) is driven in the mode of collector continuous pulse data strings to accurately operate each set of positioning data in the linear interpolation form.

The programmable logic controller calculates first bar positioning data based on the diameter of different specifications of bars, and the difference in number between the odd and even layers of bars stacked, the relative positioning address data of each layer of bars and absolute positioning address data relative to the device zero point are calculated within the procedures. The horizontal axis takes, as the maximum value of horizontal movement at each time, the sum of or the difference between the product of the first bar positioning data as base number multiplied by the number of bars stacked in the horizontal direction and the difference in number between the odd and even layers of bars stacked, the vertical axis takes, as the maximum value of vertical movement at each time, the difference between the product of the first bar positioning data as base number multiplied by the number of bars stacked in the vertical direction and the corresponding ratio of bar diameter to arc length, and the triaxial servomotor (horizontal axis, claw axis and vertical axis) is driven in the mode of collector continuous pulse data strings to accurately operate each set of positioning data in the linear interpolation form. And in the operating process, the current position base number is accumulated at the scanning speed of millisecond level, the determination whether the array of the next positioning data is correct is performed by means of reverse operation, to form close loop of data links and thus to ensure stable operation of the device. The actual position of the triaxial servomotor (horizontal axis, claw axis and vertical axis) is driven by the computations inside the programmable logic controller to correspond relative to that measured by an external detecting sensor, and the internal position point and the external position point are cross-checked, followed by calculation verification, to ensure the device operates safely and stably. The whole calculation process of the conveying mechanical device does not need manual intervention. The touch screen-based man-machine interaction and light signal display modes are employed.

An another aspect of the invention, the device works based on commands from an upper computer and operates automatically to enable the conveying mechanical device to pick up, transport and discharge the spin casting wheel hub bars.

The device of the invention has the following advantages: the mechanical bar conveying device consists of three ball screw rods vertical to one another, a rack-and-pinion mechanism and a claw portion combined mechanism at the bottom; It automatically calculates the pick-up position and travel speed of different specifications of bars (such as of 8 inches, 9 inches and 10 inches), detects the pick-up force moment in real time, does not need the participation of operators, has simple mechanical structure and stable bar clamping operation, and is convenient to use. The mechanical bar conveying device of the invention is applied to convey various bars for spin casting wheel hubs. It realizes mechanical automation of conveying operation to replace manual conveying operation in the production field in the prior art. It avoids the problems in manual conveying operation, such as high environmental temperature, heavy labor intensity, low working efficiency and potential industrial accidents.

BRIEF DESCRIPTION OF THE DRAWINGS

The embodiments of the invention will be described below in details with reference to the accompanying drawings, wherein.

Figure 1:
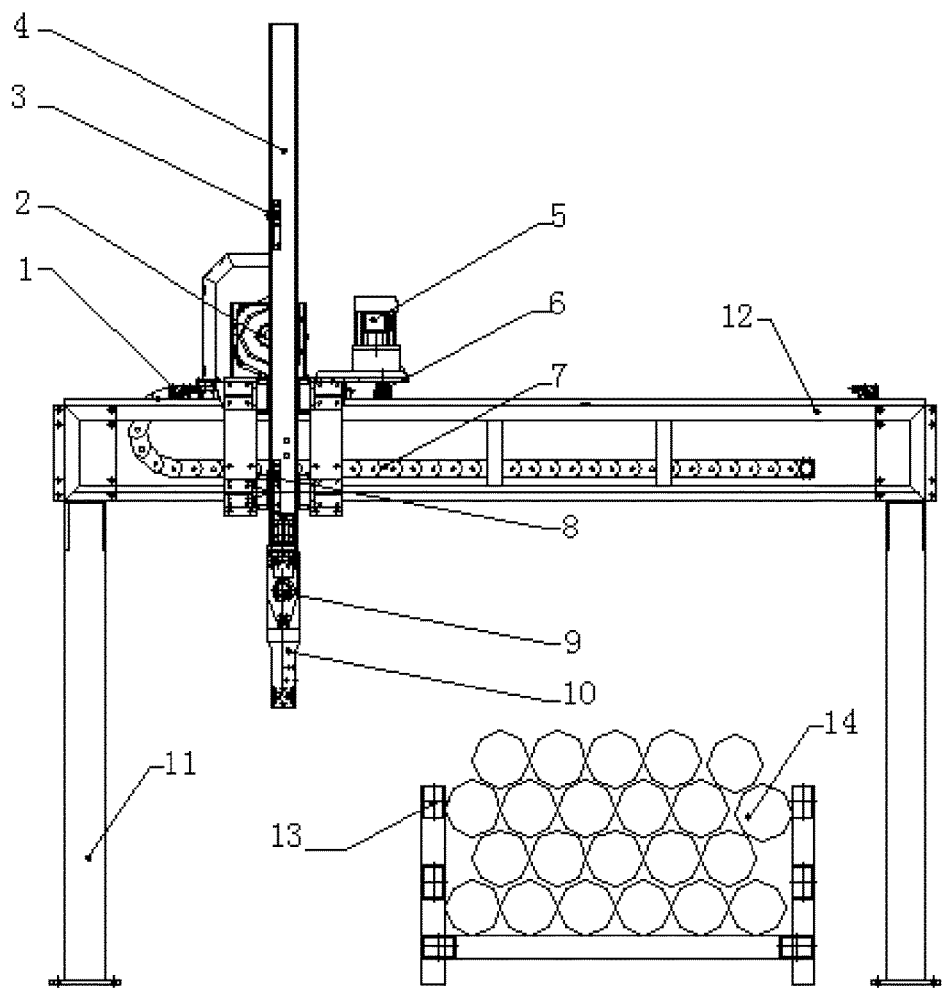
FIG. 1 is a front view of a mechanical bar conveying device of the invention.
Figure 2:
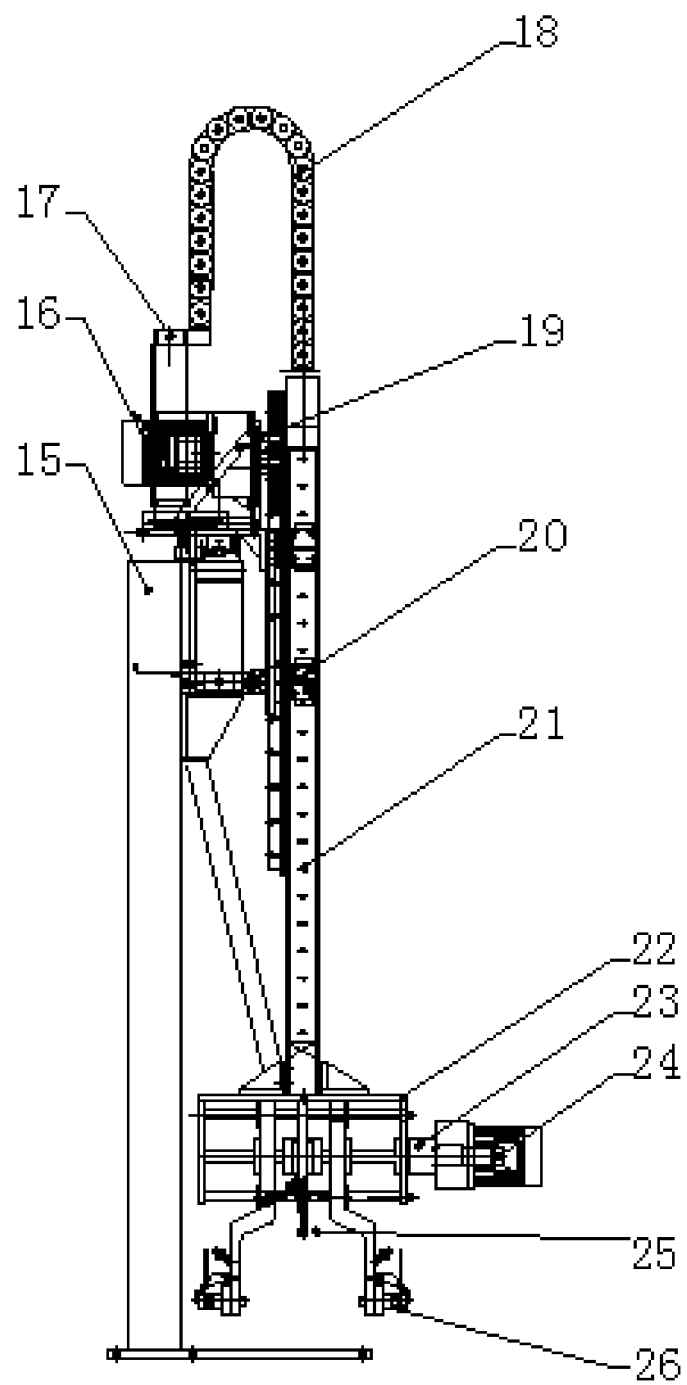
FIG. 2 is a left view of the mechanical bar conveying device of the invention.

In the drawings, 1—horizontal travel limiting device, 2—vertical axis servo reducer, 3—vertical descent depth detector, 4—vertical axis travelling mechanism, 5—horizontal axis servo reducer, 6—horizontal drive gear, 7—horizontal tow chain, 8—horizontal moving mechanism, 9—manipulator torque detector, 10—safety detection mechanism, 11—main frame, 12—horizontal frame, 13—moving feed basket, 14—bar, 15—main frame assembly, 16—vertical movement mechanism, 17—tow chain bracket, 18—tow chain, 19—vertical rack-and-pinion mechanism, 20—horizontal linear guide track, 21—vertical beam, 22—claw clamping mechanism, 23—claw ball screw, 24—manipulator servo reducer, 25—manipulator depth detector, 26—claw and travel limiting combined mechanism.

DETAILED DESCRIPTION OF THE INVENTION

Example 1

The mechanical bar conveying device essentially consists of a frame connection portion, a vertical movement portion, a horizontal movement portion, a mechanical manipulator portion and a man machine interaction display portion, including three screw rods vertical to one another, a rack and a mechanical claw at the bottom; it automatically calculates the pick-up position and travel speed of different specifications of bars (such as of 8 inches, 9 inches and 10 inches), detects the pick-up force moment in real time, does not need the participation of operators, has simple mechanical structure and stable bar clamping operation, and is convenient to use.

Based on the exchange and communication with an upper computer, the mechanical bar conveying device obtains the diameters of a bar, determines the first bar positioning data, and calculates the difference in number between the odd and even layers of bars stacked, and relative positioning address data of each layer of bars and absolute positioning address data relative to the device zero point. The triaxial servomotor (horizontal axis, claw axis and vertical axis) operates in the mode of collector continuous pulse data strings, and accurately operates each set of positioning data in the linear interpolation form, to accurately implement the pick-up and discharge positions of bars.

It returns to the servo zero point after the whole operation is completed at each time, to effectively eliminate the return difference between mechanical teeth. It is verified whether the actual position of the triaxial servomotor of the mechanical bar conveying device corresponds to the parameters measured by an external detecting sensor, and the internal position point and the external position point are cross-checked, followed by calculation verification, so as to form close loop of data links of the mechanical bar conveying device and ensure the device operates safely and stably.

The horizontal axis takes, as the maximum value of horizontal movement at each time, the sum of or the difference between the product of the first bar positioning data as base number multiplied by the number of bars stacked in the horizontal direction and the difference in number between the odd and even layers of bars stacked, the vertical axis takes, as the maximum value of vertical movement at each time, the difference between the product of the first bar positioning data as base number multiplied by the number of bars stacked in the vertical direction and the corresponding ratio of bar diameter to arc length, and the triaxial servomotor (horizontal axis, claw axis and vertical axis) is driven in the mode of collector continuous pulse data strings to accurately operate each set of positioning data in the linear interpolation form. And in the operating process, the current position base number is accumulated at the scanning speed of millisecond level, the determination whether the array of the next positioning data is correct is performed by means of reverse operation, to form close loop of data links and thus to ensure stable operation of the device. The actual position of the triaxial servomotor (horizontal axis, claw axis and vertical axis) is driven by the computations inside the programmable logic controller to correspond relative to that measured by an external detecting sensor, and the internal position point and the external position point are cross-checked, followed by calculation verification, to ensure the device operates safely and stably. The whole calculation process of the conveying mechanical device does not need manual intervention. The touch screen-based man-machine interaction and light signal display modes are employed.

During the use in Daikalida field in 2015, the device, as a substitute for manual operation, realizes automatic feeding, saving the manual labor by about 3 persons. It realizes mechanical automation of conveying operation to replace manual conveying operation in the production field in the prior art. It effectively avoids the problems in manual conveying operation, such as high environmental temperature, heavy labor intensity, low working efficiency and potential industrial accidents. The mechanical bar conveying device has the advantages of simple structure, good mechanical dynamic performance, convenient operation and high degree of automation.

The invention claimed is:

1. A mechanical bar conveying device comprising: a horizontal travel limiting device (1), a vertical axis servo reducer (2), a vertical descent depth detector (3), a vertical axis travelling mechanism (4), a horizontal axis servo reducer (5), a horizontal drive gear (6), a horizontal tow chain (7), a horizontal moving mechanism (8), a manipulator torque detector (9), a safety detection mechanism (10), a main frame (11), a horizontal frame (12), a vertical movement mechanism (16), a tow chain bracket (17), a tow chain (18), a vertical rack-and-pinion mechanism (19), a horizontal linear guide track (20), a vertical beam (21), a claw clamping mechanism (22), a claw ball screw (23), a manipulator servo reducer (24), a manipulator depth detector (25), and a claw and travel limiting combined mechanism (26), wherein the main frame (11) is mounted on the ground, the horizontal frame (12) is mounted on the main frame (11), so that the main frame (11) and the horizontal frame (12) are assembled into a main frame assembly (15); the horizontal linear guide track (20) is mounted on the horizontal frame (12) with its guide track direction being horizontal; the horizontal travel limiting device (1) is mounted on the horizontal frame (12) and located at one end of the horizontal linear guide track (20); the horizontal moving mechanism (8) is mounted on the horizontal linear guide track (20), and the horizontal axis servo reducer (5) and the horizontal tow chain (7) are mounted to the horizontal moving mechanism (8) and arranged to allow the horizontal moving mechanism (8) to move on the horizontal linear guide track (20) by the horizontal drive gear (6), to achieve free movement in a horizontal direction; the vertical descent depth detector (3), the tow chain bracket (17), the tow chain (18) and the vertical rack-and-pinion mechanism (19) are mounted on the vertical beam (21); the vertical axis servo reducer (2) and the vertical axis travelling mechanism (4) are vertically mounted on the horizontal moving mechanism (8) and arranged to fix and support the vertical beam (21) by engagement of the vertical rack-and-pinion mechanism (19); the manipulator torque detector (9), the safety detection mechanism (10), the manipulator depth detector (25) and the claw and travel limiting combined mechanism (26) form a claw portion of the mechanical bar conveying device, which is connected onto a bottom end of the vertical beam (21); the vertical axis travelling mechanism (4) is vertically mounted on a crossbeam of the horizontal moving mechanism (8) and arranged to make free movement in a vertical direction by the vertical movement mechanism (16) and driving the vertical rack-and-pinion mechanism (19); the claw clamping mechanism (22) is connected with the manipulator servo reducer (24) by the claw ball screw (23), and the claw clamping mechanism (22) is mounted at a bottom end of the vertical axis travelling mechanism (4) and connected with the claw and travel limiting combined mechanism (26); the claw clamping mechanism (22) and the claw ball screw (23) are arranged to control fastening and unfastening of the claw and travel limiting combined mechanism (26); the vertical axis travelling mechanism (4), the horizontal moving mechanism (8) and the claw clamping mechanism (22) are driven by a servomotor; and the vertical descent depth detector (3), the manipulator torque detector (9) and the manipulator depth detector (25) are connected to the vertical axis travelling mechanism (4) and arranged to detect vertical descent depth, claw torque and claw depth, respectively.

2. The mechanical bar conveying device according to claim 1, wherein the mechanical bar conveying device is arranged to be controlled by a programmable logic controller, and the programmable logic controller is arranged to be a global positioning system for automatic addressing operation.

3. The mechanical bar conveying device according to claim 1, wherein the programmable logic controller is arranged to calculate a first bar position, relative positioning address of each layer of bars and absolute positioning address relative to the device zero point, based on input bar diameters, numbers of bar stacking layers and bar stacking positions, and is arranged to calculate the moving distance of the claw and travel limiting combined mechanism (26) under the control of the servomotor, based on a relative positioning address of the conveyed bar.

4. The mechanical bar conveying device according to claim 3, wherein the horizontal axis of the claw and travel limiting combined mechanism (26) takes, as the maximum value of horizontal movement at each time, the sum of or the difference between the product of the first bar positioning data as base number multiplied by the number of bars stacked in the horizontal direction and the difference in number between the odd and even layers of bars stacked, the vertical axis of the mechanism (26) takes, as the maximum value of vertical movement at each time, the difference between the product of the first bar positioning data as base number multiplied by the number of bars stacked in the vertical direction and the corresponding ratio of bar diameter to arc length, and the triaxial servomotor (horizontal axis, claw axis and vertical axis) is driven in the mode of collector continuous pulse data strings to accurately operate each set of positioning data in the linear interpolation form.

* * * * *